US010938752B2

(12) United States Patent
Narendra et al.

(10) Patent No.: US 10,938,752 B2
(45) Date of Patent: Mar. 2, 2021

(54) ONLINE FORUM AUTOMATED FEEDBACK GENERATOR

(71) Applicant: International Business Machines Corporation, Armonk, NY (US)

(72) Inventors: Tanmayee Narendra, Bengaluru (IN); Tarun Tater, Bangalore (IN); Srikanth Govindaraj Tamilselvam, TamilNadu (IN); Senthil Kumar Kumarasamy Mani, Thanisanndra (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/358,741

(22) Filed: Mar. 20, 2019

(65) Prior Publication Data

US 2020/0304435 A1    Sep. 24, 2020

(51) Int. Cl.
*G06F 15/16* (2006.01)
*H04L 12/58* (2006.01)
*G06F 11/34* (2006.01)
*G06F 9/54* (2006.01)

(52) U.S. Cl.
CPC .............. *H04L 51/02* (2013.01); *G06F 9/543* (2013.01); *G06F 11/3438* (2013.01)

(58) Field of Classification Search
CPC ............ G06N 5/04; G06N 5/02; G06N 5/003; G06N 20/20; G06F 21/32; G06F 16/3329; G06F 16/248; G06F 21/6218; G06F 3/0482; G06F 3/0488; H04L 63/0861; H04L 51/046

See application file for complete search history.

(56) References Cited

U.S. PATENT DOCUMENTS

| 8,676,596 | B1 | 3/2014 | Franson | |
|---|---|---|---|---|
| 8,972,428 | B2 | 3/2015 | Dicker | |
| 2010/0077008 | A1* | 3/2010 | Davis | G06F 16/93 707/797 |
| 2015/0082277 | A1 | 3/2015 | Champlin-Scharff | |
| 2015/0095267 | A1* | 4/2015 | Behere | H04L 67/42 706/11 |
| 2015/0271026 | A1* | 9/2015 | Meduri | H04L 67/18 709/224 |

* cited by examiner

*Primary Examiner* — Michael A Keller
*Assistant Examiner* — Thao D Duong
(74) *Attorney, Agent, or Firm* — Joseph P. Curcuru; Gilbert Harmon, Jr.

(57) ABSTRACT

Embodiments describe an approach for automatically generating feedback for an online forum. Embodiments determine if a user is using a solution to a problem, wherein the solution is posted on an online forum, and responsive to determining the user is using the solution, capturing environment information associated with the user's computing device. Additionally, embodiments determine if the solution solved the problem, and responsive to determining the solution solved the problem, automatically generate feedback associated with the solution, wherein the feedback comprises the environment information and information detailing that the solution solved the problem.

20 Claims, 3 Drawing Sheets

ONLINE FORUM AUTOMATED FEEDBACK GENERATOR

BACKGROUND

The present invention relates generally to the field of online feedback, and more particularly to automated online feedback.

Online user feedback is intended for those looking to extract insights into aspects of a user's online experience. It predominantly sheds light on any potential barriers that users encounter which may prevent them from solving a particular issue. Online feedback can be obtained in several different ways. One particular form of user feedback is an online feedback form (e.g., feedback form). A feedback form is a dynamic tool which is used to capture user feedback on websites and apps. Feedback forms can be triggered on a website in various ways with the goal of attaining specific feedback from a user and determining whether or not the user has reached a particular online goal. In the world of online user feedback, feedback forms can come in many different shapes and sizes. Applying these forms to a website can help gauge which issues a user is running into, why the users are solving the issue, how the users are solving the issue and much more.

An online forum, or message board, is an online discussion site where users can hold conversations in the form of posted messages. They differ from chat rooms in that messages are often longer than one line of text and are at least temporarily archived. Also, depending on the access level of a user or the forum set-up, a posted message might need to be approved by a moderator before it becomes visible. Forums have a specific set of j argon associated with them, for example: a single conversation is called a "thread", or topic. A discussion forum is hierarchical or tree-like in structure: a forum can contain a number of subforums, each of which may have several topics. Within a forum's topic, each new discussion started is called a thread and can be replied to by any number of users. Depending on the forum's settings, users can be anonymous or have to register with the forum and then subsequently log in to post messages. On most forums, users do not have to log in to read existing messages.

SUMMARY

Embodiments of the present invention disclose a method, a computer program product, and a system for automatically generating feedback for an online forum, the method comprising: determining, by one or more processors, if a user is using a solution to a problem, wherein the solution is posted on an online forum; responsive to determining the user is using the solution, capturing, by the one or more processors, environment information associated with the user's computing device; determining, by the one or more processors, if the solution solved the problem; and responsive to determining the solution solved the problem, automatically generating, by the one or more processors, feedback associated with the solution, wherein the feedback comprises the environment information and information detailing that the solution solved the problem.

DETAILED DESCRIPTION

Figure 1:
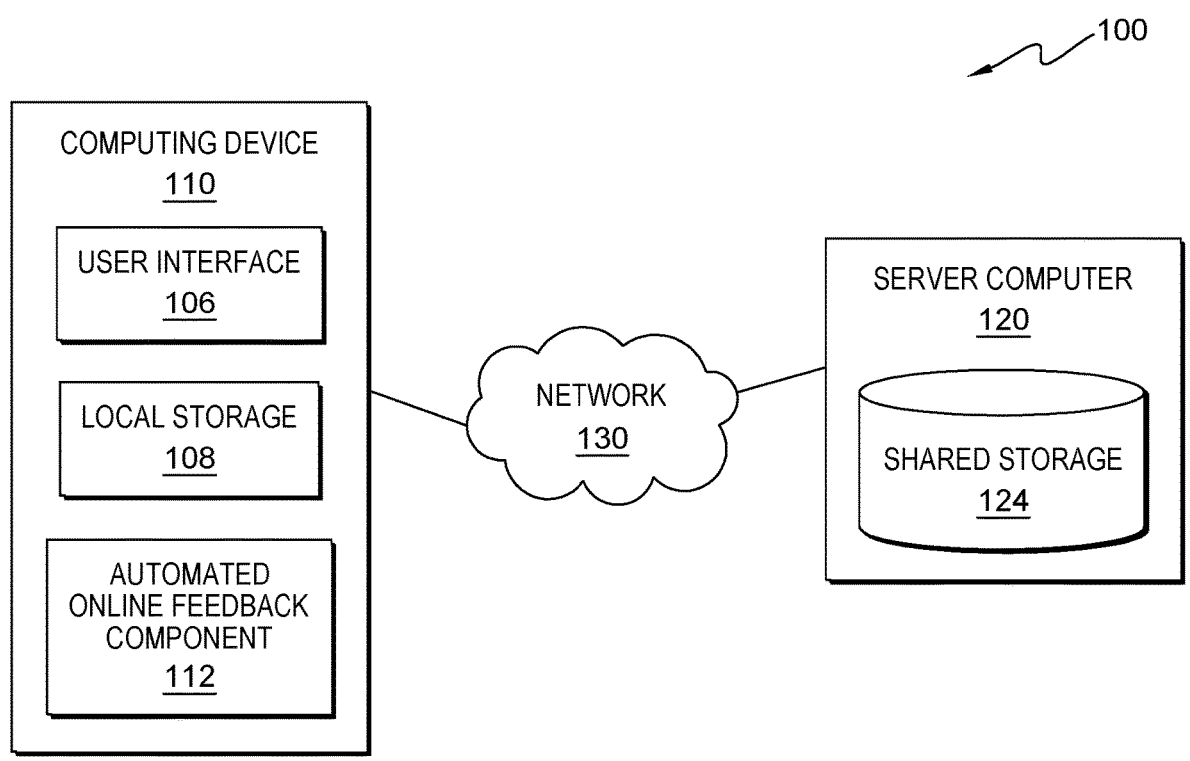
FIG. 1 is a functional block diagram illustrating a distributed data processing environment, in accordance with an embodiment of the present invention.

Currently, website developers and computer programmers (e.g., users) use a combination of both open (e.g., public) online forums, online blogs, and online feedback to search for solutions to problems (e.g., bugs) in a particular program or piece of code. For example, a user us an online forum to lookup a solution to a debugging issue. The feedback in online forums can be in many forms such as, but not limited to, upvoting or downvoting answers, answering open questions in discussion thread, posting comments or questions to an open thread, and responding to the open questions with answers or comments. It should be noted that a thread is a conversation/topic thread in a discussion forum as known in the art. For example, a string of comments and/or questions related to a particular topic. An upvote or a downvote can be an online feedback response. For example, an upvote is a positive vote (e.g., liking a post) and a downvote is a negative vote (e.g., disliking a post). For example, an answer (e.g., post) might not have worked because of a version mismatch that was not mentioned in the answer so the user downvotes the answer and provides no additional feedback. In another example, an answer (e.g., an online forum post) worked but with a different set of environment information than what was mentioned in the answer so the user upvotes answer and provides no additional feedback. It should be noted that an answer is an online forum post.

In other cases, a user does not go back and give feedback to the question and answer. Additionally, the user does not explain whether the solution on the forum worked or didn't work for the user and does not explain why it worked or didn't work, which creates a knowledge gap between users. Environment information can be, but is not limited to, environment variables (e.g., the state of a computer operating system (OS), the programs running on the OS, the basic hardware and software characteristics of the OS and/or the computer such as the OS and/or software version, amount of available memory on the hard drive, and/or any other environmental variables known in the art), operating environment, any hardware and/or software information, and/or any other environment information known in the art. A solution can be, but is not limited to, a solution to a problem that the user is facing that is posted on an online forum as an answer post. It should be noted that the term online forum means an online forum, an online blog, or a combination thereof.

Furthermore, users fail to follow up with feedback, such as supporting questions to solutions on internet forums that can help the user or help other users on the same thread. Some factors that might limit a user from leaving feedback are: failure to notice follow up or supporting questions, sign in required to enter the portal to provide feedback, etc. Embodiments of the present invention recognized that feedback is essential to strengthen the knowledge platform of online forums. Deficiencies in the current online forum feedback system are recognized by embodiments of the invention. Embodiments of the present invention solve the user feedback issues faced in online forums by automatically generating online feedback based on a user's actions on an online forum. Additionally, embodiments of the present invention can solve the user feedback issues stated above by identifying and capturing potential questions on an online forum (e.g., a message board or a focused thread); automatically collate the environment variables such as, but not limited to: OS details, program version, and/or any other environment variables known in the art; prompting the user for answers; and suggesting solutions in the form of feedback for one or more sub threads or one or more questions on the forum that are related to the solution the user tried to use.

Embodiments of the present invention can capture the environment variables of a user's system (e.g., computer system) and identify the portion of the webpage consumed by the user (e.g., the solution used by the user) when a solution posted in the forum is tried or the solution used by the user worked both explicitly or implicitly. Furthermore, embodiments of the present invention can identify if the solution that worked for the user and identify potential questions related to the solution the user used or the issue the user is trying to solve from various websites (e.g., online forums). The potential questions can include: open questions, follow-up questions, and supporting questions captured from open sub-threads and focused threads. Embodiments of the present invention can automatically collate the environment variables. Additionally, embodiments of the present invention can automatically generate feedback and display one-click request prompts to the user enabling the user to either upvote or down vote the question and/or answer on the online forum. Embodiments of the present invention can parse a webpage or an online forum, identify open sub-threads and questions, and automatically generate answers and/or comments for the existing open questions and/or comments based on the user's environment variables and information regarding the user's success using the answer in the forum. Embodiments of the present invention can automatically populate a response prompt that answers the open questions in an online forum based on the user's success using the answer to solve an issue and providing environmental variables.

The present invention will now be described in detail with reference to the Figures. FIG. 1 is a functional block diagram illustrating a distributed data processing environment, generally designated 100, in accordance with one embodiment of the present invention. The term "distributed" as used in this specification describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims. Distributed data processing environment 100 includes server computer 120 and computing device 110 interconnected over network 130.

Network 130 can be, for example, a storage area network (SAN), a telecommunications network, a local area network (LAN), a wide area network (WAN), such as the internet, a wireless technology for exchanging data over short distances (using short-wavelength ultra-high frequency (UHF) radio waves in the industrial, scientific and medical (ISM) band from 2.4 to 2.485 GHz from fixed and mobile devices, and building personal area networks (PANs) or a combination of the three), and can include wired, wireless, or fiber optic connections. Network 130 can include one or more wired and/or wireless networks that can receive and transmit data, voice, and/or video signals, including multimedia signals that include voice, data, text and/or video information. In general, network 130 can be any combination of connections and protocols that will support communications between computing device 110, automated online feedback component (AOFC) 112, shared storage 124, and server computer 120, and any other computing devices and/or storage devices (not shown in FIG. 1) within distributed data processing environment 100.

Server computer 120 can be a standalone computing device, a management server, a web server, a mobile computing device, one or more client servers, or any other electronic device or computing system capable of receiving, sending, and processing data. In other embodiments, server computer 120 can represent a server computing system utilizing multiple computers such as, but not limited to, a server system, such as in a cloud computing environment. In another embodiment, server computer 120 can represent a computing system utilizing clustered computers and components (e.g., database server computers, application server computers, etc.) that act as a single pool of seamless resources when accessed within distributed data processing environment 100. Server computer 120 can include internal and external hardware components, as depicted, and described in further detail with respect to FIG. 3.

In various embodiments, computing device 110 can be, but is not limited to, a standalone device, a client, a server, a laptop computer, a tablet computer, a netbook computer, a personal computer (PC), a smart phone, a desktop computer, a smart television, a smart watch, a radio, a stereo system, a cloud based service (e.g., a cognitive cloud based service), and/or any programmable electronic computing device capable of communicating with various components and devices within distributed data processing environment 100, via network 130 or any combination therein. In general, computing device 110 can be representative of any programmable computing device or a combination of programmable computing devices capable of executing machine-readable program instructions and communicating with users of other computing devices via network 130, capable of executing machine-readable program instructions and communicating with server computer 120.

In other embodiments, computing device 110 can represent any programmable electronic computing device or combination of programmable electronic computing devices capable of executing machine readable program instructions, manipulating executable machine-readable instructions, and communicating with server computer 120 and other computing devices (not shown) within distributed data processing environment 100 via a network, such as network 130. In the depicted embodiment, computing device 110 includes user interface (UI) 106 and local storage 108. In various embodiments, not depicted in FIG. 1, computing device 110 can have one or more user interfaces. In other embodiments, not depicted in FIG. 1, environment 100 can comprise one or more computing devices, one or more server computers, and/or one or more networks. In the depicted embodiment, computing device 110 houses automated online feedback component (AOFC) 112.

User interface (UI) 106 provides an interface to AOFC 112 via network 130 for a user of computing device 110 or server computer 120. In various embodiments, UI 106 can enable a user, a client, or both to interact with AOFC 112, computing device 110, server computer 120, or any combination thereof. For example, a computer system and display screen enabling a user to send program instructions, receive program instructions, send messages, receive messages, update data, send data, input data, edit data, collect data, receive data, or any combination thereof from a server or a program. In another example, UI 106 enables a user to provide feedback to an online forum. In one embodiment, UI 106 can be a graphical user interface (GUI) or a web user interface (WUI) and can display text, documents, web browser windows, user options, application interfaces, and instructions for operation. UI 106 can include information such as graphic, text, and sound. UI 106 can enable a program to be presented to a user and enable control sequences the user employs to control the program. In another embodiment, UI 106 can be a mobile application software providing an interface between a user of computing device 110 and server computer 120. Mobile application software, or an "app," can be a computer program designed to run on smart phones, tablet computers and other computing devices. In an embodiment, UI 106 can enable the user of computing device 110 to send data, input data, edit data (annotations), collect data and/or receive data.

Each of shared storage 124 and local storage 108 can be a data/knowledge repository and a database that can be written and read by one or a combination of AOFC 112, server computer 120, and computing device 110. In the depicted embodiment, shared storage 124 resides on server computer 120 and local storage 108 resides on computing device 110. In another embodiment, shared storage 124 and local storage 108 can each reside elsewhere within distributed data processing environment 100, provided that each can access at least one of computing device 110 and server computer 120 and each are accessible by at least one of computing device 110 and server computer 120. Shared storage 124 and local storage 108 can each be implemented with any type of storage device capable of storing data and configuration files that can be accessed and utilized by server computer 120, computing device 110, or any combination thereof, such as, but not limited to, a database server, a hard disk drive, or a flash memory. In other embodiments, shared storage 124 and local storage 108 can each be a hard drive, a memory card, a computer output to laser disc (cold storage), or any form of data storage known in the art. In some embodiments, shared storage 124 and local storage 108 can each be one or more cloud storage systems or databases linked to a cloud network.

In the depicted embodiment, AOFC 112 is housed on computing device 110. In various embodiments, not depicted in FIG. 1, AOFC 112 can be housed on server computer 120 or housed anywhere within distributed data processing environment 100 as long as AOFC 112 is interconnected to computing device 110 or server computer 120 through network 130. In other embodiments, not depicted in FIG. 1, AOFC 112 can be a standalone component that can be anywhere within distributed data processing environment 100 as long as AOFC 112 is interconnected to computing device 110 or server computer 120 through network 130.

In various embodiments, AOFC 112 can capture the environment variables of a user's computing device 110 and identify the portion of the webpage consumed by the user (e.g., a solution posted in the forum that the user used to try and solve an issue on computing device 110) either explicitly or implicitly. In various embodiments, AOFC 112 can identify if the solution (e.g., one or more posts on an online forum) that the user used worked for the user and identify potential questions related to the solution the user used from various websites (e.g., online forums). In various embodiments, the potential related questions can be, but are not limited to, open questions, follow-up questions, and supporting questions captured from open sub-threads and focused thread. In various embodiments, AOFC 112 can automatically collate the user's environment variables (e.g., software version, OS details, and any other environment variable known in the art). Additionally, in one particular embodiment, AOFC 112 can automatically generate feedback and display one-click request prompts to the user. In this particular embodiment, AOFC 112 can be responsive to the user's selection of the display prompt, wherein AOFC 112 can generate either one or more upvotes or one or more down votes to the question and/or answer on the online forum based on the user's response.

In various embodiments, AOFC 112 can parse a webpage (e.g., an online forum); identify open sub-threads and open questions on the webpage related to the solution the user is using; and can automatically generate answers and/or comments (e.g. feedback) for the identified open questions, sub-threads, and/or comments. In various embodiments, the generated feedback can be based on the user's environment variables and information regarding the user's success using a selected answer in the forum. In various embodiments, AOFC 112 can automatically populate a response prompt, wherein the response prompt asks the user if the solution the user has tried worked in solving the user's issue. In one particular embodiments, AOFC 112 is responsive to a user's selection and generates one or more feedback responses to identified open questions, sub-threads, and/or comments on an online forum based on the user's success using the answer to solve an issue. In various embodiments, AOFC 112 can provide environmental variables (e.g., OS, OS version, software, software version, additional steps used that were not disclosed in the original answer, amount of memory, amount of available memory on the users computing device, etc.) to a generated feedback response. For example, AOFC 112 displays a response prompt, via UI 106, asking the user "Was the solution helpful", in which the user selects "No." In this particular example, AOFC 112 will generate a feedback response stating "this solution was not helpful for OS 9.5.2.

In various embodiments, AOFC 112 enables a user to perform an initial setup. It should be noted herein that all participating parties (e.g., the user and/or forum users) have consented to being recorded and monitored. Additionally, the participating parties have given permission for AOFC 112 to record and store user data, the user's environmental data, the generated responses, etc. In various embodiments, a user consents to being recorded or monitored during the initial setup. In various embodiments, the initial setup enables AOFC 112 to link to one or more online forums. In various embodiments, the initial setup comprises AOFC 112 instructing the user to login to the one or more online forums and linking to the one or more online forums. For example, AOFC 112 instructs a user to perform a one-time login into an online forum that is linked to AOFC 112. In other embodiments, AOFC 112 can display a list of online forums that AOFC 112 is linked to for user selection, wherein the user can select one or more online forums to login to and assign AOFC 112 to monitor and provide automated feedback. In some embodiments, AOFC 112 can be a software application that works as a plugin (e.g., add on) tool on a user's search engine and/or computing device 110. In various embodiments, the initial setup can further comprise a pre-approval setting. Pre-approval settings can comprise AOFC 112 instructing a user to pre-approve the environment variables that can be captured by AOFC 112 and enable the user to pre-approve the type of feedback AOFC 112 generates (e.g., the type of feedback the user would prefer to give). For example, some users may be comfortable with upvoting or downvoting a particular answer on a forum but may not want to leave comments on the online blogs or the online forums. In various embodiments, the pre-approval settings set guidelines for feedback generated by AOFC 112.

In other embodiments, AOFC 112, via the pre-approval settings, can enable a user to create and edit one or more predetermined feedback responses. In various embodiments, AOFC 112, via pre-approval settings, can enable a user to select how detailed or specific of a response (e.g., feedback) the user wants AOFC 112 to generate. In various embodiments, AOFC 112 can link pre-approval settings, set by the user, to one or more forums. In various embodiments, AOFC 112 can enable the user to select which type of feedback the user wants AOFC 112 to generate. In some embodiments, AOFC 112 can enable a user, via pre-approval settings, to customize the predetermined feedback responses and the predetermined feedback preferences to specific online forums. For example, a user sets the pre-approval settings to generate generic responses for online blogs. In another example, the user sets the pre-approval settings to only generate upvotes and downvotes for online forums. In some embodiments, AOFC 112 can enable a user to create and edit a list of feedback responses that can be generic and/or specific. For example, AOFC 112 enables a user to create a list of generic predetermined feedback responses such as "great answer," "didn't work," "awesome," "not helpful," "very helpful," etc. In another embodiments, AOFC 112 can automatically generate a list of predetermined feedback responses that a user can edit.

In various embodiments, AOFC 112 can detect when a user is using a solution found on an online forum by continuously monitoring the user's action/activity on computing device 110 and one or more online forums. A user's action and/or activity can be, but is not limited to, searching network 130 using search terms or strings related to a computer related issue, copying and pasting data from one or more online forums, participating in an online forum, editing code, updating one or more files, creating one or more files, and/or any other form of user activity known in the art. A file can be, but is not limited to, a source file, a document file, and/or any other type of file known in the art. In various embodiments, AOFC 112 can utilize an explicit copy and paste detector to detect when a user is trying a solution from the online forum. For example, the explicit copy and paste detector uses key logging software to detect that the user has used the copy function on the OS to copy content from the browser and detects that the user has used the paste function on the OS to paste the content from the browser onto a file.

In various embodiments, AOFC 112 can record a source URL, content, a DOM object, screen coordinates, a target file path, target application name, and/or a timestamp when AOFC 112 detects a user is trying a solution found on an online forum. In other embodiments, AOFC 112 can use an implicit copy and paste detector to detect when a user is using a solution found on an online forum. In various embodiments, a user may not explicitly copy the information (e.g., solution) from an online forum or blog but may only take hints or snippets and modify according to their needs. For example, AOFC 112, via the implicit copy and paste detector, captures the user's interactions between the files and the online forum by tracking the repeated switching between a set of two or more applications and the k threshold similarity of phrases between the answer (e.g., solution) on the online forum (e.g., source) and the file being corrected/edited (e.g., the issue). In various embodiments, the k threshold is the threshold identified by extracting similar top-k strings with respect to a query string. The k threshold can be calculated by calculating the smallest edit distance to the query string, wherein the smaller the edit distance between the query string and the extracted string the more similar the phrases are. Edit distance is a way of quantifying how dissimilar two strings (e.g., words) are to one another by counting the minimum number of operations required to transform one string into the other. Edit distances find applications in natural language processing, where automatic spelling correction can determine candidate corrections for a misspelled word by selecting words from a dictionary that have a low distance to the word in question. In various embodiments, AOFC 112 can use both the explicit and implicit copy and paste detectors to detect when a user is using a solution found on an online forum.

In various embodiments, AOFC 112 can capture environment variables from the user's computing device (e.g., computing device 110). For example, when a user tries a solution posted on an online forum, AOFC 112 captures the environment variables of the user's computing device. In various embodiments, the set of environment variables that can be captured can be pre-approved by the user, via the pre-approval settings.

In various embodiments, AOFC 112 can identify if a solution from an online forum that the user tried has solved the user's issue. In various embodiments, AOFC 112 can either semi-automatically or automatically identify if a solution worked (e.g., solved the user's issue). In one particular embodiment, AOFC 112 can semi-automatically identify if the solution, from an online forum, the user tried has solved the users issued by asking the user if the solution worked for the user. For example, AOFC 112 displays a one-click response prompt asking the user if the solution the user has tried worked in solving the user's issue. In another embodiment, AOFC 112 can automatically identify if the solution from the online forum the user has tried worked (e.g., solved the user's problem) by utilizing a rule-based system to decide if solution worked. For example, one rule for AOFC 112 is designated to be that a solution is deemed to have worked if the user does not try any more solutions and the user does not make any more search queries using similar terms to a previous search query related to the issue the user is trying to solve or has solved.

In various embodiments, AOFC 112 can automatically generate feedback for one or more online forums that the user used to solve a particular issue. In various embodiments, when generating feedback, AOFC 112 can detect the kind of website (e.g., community QA, discussion forum (i.e., online forum), blog post, mailing list archive, etc.) in order to determine the user's pre-approved settings. The generated feedback can be various kinds of feedback depending on the nature of the website from where the solution was taken and the users pre-approved settings. In various embodiments, the generated feedback can be an upvote or downvote of a question, a upvote or downvote of an answer, one or more answers for one or more existing questions or comments, one or more comments containing the user's environment variables, and/or a comment with information on whether or not the solution worked for the user. In various embodiments, AOFC 112 can automatically generate answers (e.g., feedback) for existing open questions and comments on an online forum and can automatically generate feedback with user's environment variables, and with information on whether the solution the user tried worked or failed. In various embodiments, AOFC 112 can display the automatically generated feedback for the user to confirm with one-click to determine if the user desires to provide feedback, via UI 106.

In various embodiments, AOFC 112 can parse one or more comments and one or more open questions from the one or more online forums to identify open sub-threads related to the solution the user used. In various embodiments, AOFC 112 can utilize one or more natural language processor (NLP) triggers to determine if the comments and questions on the one or more online forums and/or one or more online blogs are related to the solution the user used, and if the comments or questions on the one or more online forums and/or one or more online blogs are asking questions related solution the user used. For example, AOFC 112 identifies an open thread on an online forum that reads "does this work for operating system 10.12.6?" resulting in AOFC 112 generates an automatic feedback response using the user's environmental variables stating "Yes, this works for operating system (10.12.6).

Figure 2:
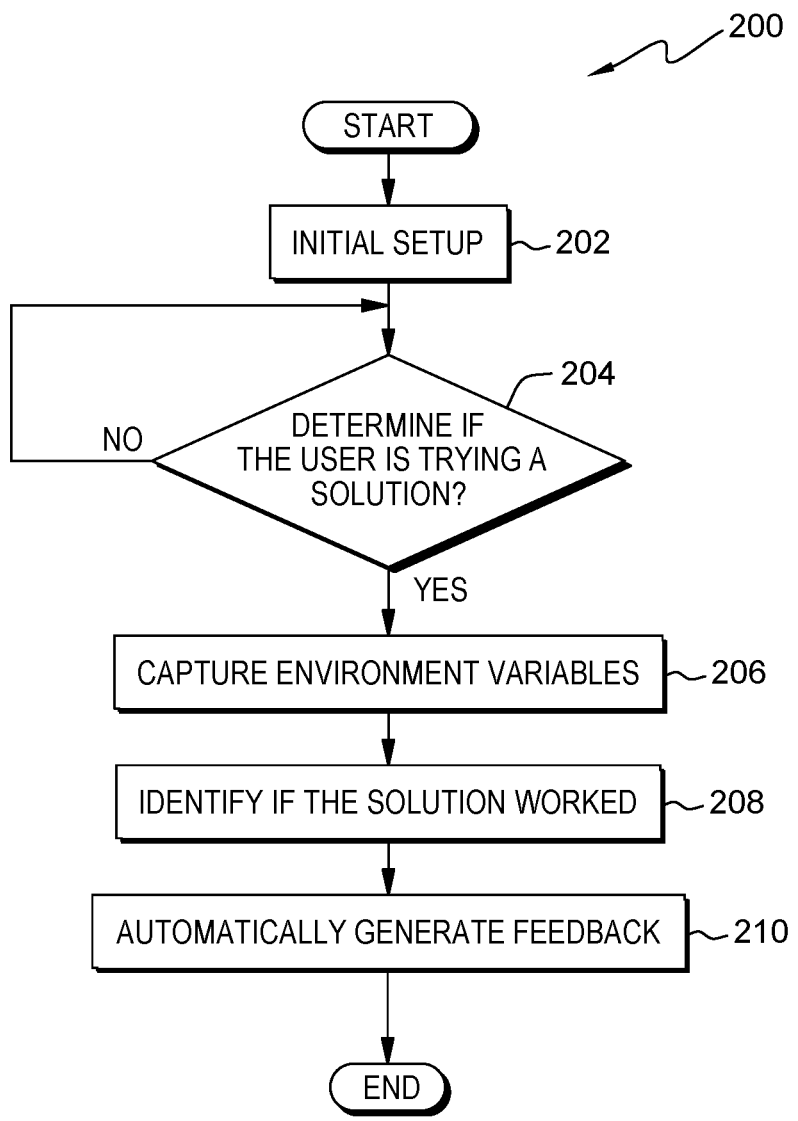
FIG. 2 illustrates operational steps of an automated online feedback component, on a computing device within the data processing environment of FIG. 1, for automatically generating online feedback, in accordance with an embodiment of the present invention.

FIG. 2 illustrates operational steps of AOFC 112 on computing device 110 within distributed data processing environment 100 of FIG. 1 for automatically generating online feedback. FIG. 2 provides an illustration of one implementation and does not imply any limitations with regard to the environments in which different embodiments can be implemented. Many modifications to the depicted environment can be made by those skilled in the art without departing from the scope of the invention as recited by the claims.

In step 202, AOFC 112 initiates an initial setup. In various embodiments, AOFC 112 can initiate an initial setup enabling a user to login to one or more online forums and/or one or more online blogs. For example, AOFC 112 instructs the user to select and login to the online forums of the user's choosing and links to the online forums the user selected. In various embodiments, AOFC 112 can instruct the user to set pre-approval settings. For example, AOFC 112 instructs the user to determine the pre-approval settings for online forums, in which AOFC 112 links the pre-approval settings to the online forum. In this particular example, the pre-approval settings can be set to enable AOFC 112 to upvote or downvote an identified question, upvote or down vote an identified answer or comment, comment on an answer, capture environment variables, and prohibit any response or prohibit the capturing of environment variables.

In step 204, AOFC 112 determines if the user is using a solution. In various embodiments, AOFC 112 can determine if the user is using a solution from an online forum to solve an issue on computing device 110 by monitoring a user's activity on computing device 110 and one or more online forums. In the depicted embodiment, if AOFC 112 determines that the user is not using data (e.g., trying a solution) from one or more online forums (No Branch), then AOFC 112 can continually monitor the user's activity on one or more online forums until it detects a user is trying a solution from an online forum or AOFC 112 is deactivated. In the depicted embodiment, if AOFC 112 determines that the user is using data (e.g., trying a solution) from one or more online forums (Yes Branch), then AOFC 112 can advance to step 206.

In step 206, AOFC 112 captures the environment variables of the user's computing device (e.g., computing device 110). In various embodiments, AOFC 112 can capture (e.g., identify and record) the user's environment variables. For example, AOFC 112 captures the software version, amount of available memory, and model number of computing device 110. In various embodiments, AOFC 112 can consult the pre-approval settings set by the user to determine which environmental variables to capture.

In step 208, AOFC 112 identifies if the solution the user used worked. In various embodiments, AOFC 112 can identify whether the solution the user used from the online forum or online worked or didn't work. In various embodiments, AOFC 112 can identify if one or more solutions worked semi-automatically by displaying a prompt asking the user if the solution the user used worked. In other embodiments, AOFC 112 can identify if one or more solutions worked automatically by utilizing a rule-based system to decide if solution worked. For example, AOFC 112 semi-automatically identifies that the solution the user used from the online forum solved the issue on computing device 110 by displaying a prompt asking the user if the solution worked. In a different example, AOFC 112 automatically identifies that the solution the user used worked (e.g., solved the user's issue) by following the ruled based system where one rule is designated to be that a solution is deemed to have worked if the user does not try any more solutions. Additionally, in this particular example, another rule in the rule-based system is if the user does not make a search query with similar terms relating to one or more previous search queries related to the issue the user is trying to solve then the user has solved that particular issue.

In step 210, AOFC 112 automatically generates feedback. In various embodiments, AOFC 112 can generate feedback for the solution the user used to try to solve an issue on computing device 110. In various embodiments, AOFC 112 generates feedback based on the captured environment variables, the information identifying if the solution worked or didn't work, and the pre-approval setting. In various embodiments, AOFC 112 can display a one-click confirmation prompt asking the user if the solution (e.g., information) was helpful. For example, after AOFC 112 detects the user tried a solution from an online forum, AOFC 112 displays a one-click confirmation prompt stating "Was this information helpful?", enabling the user to select a yes option, a no option, or an irrelevant option. In this particular example, if the user selects yes then AOFC 112 can upvote the solution on the online forum and/or post a generic comment (e.g., feedback) for the solution on the online forum. In various embodiments, AOFC 112 can generate feedback that contains the user's environment variables. For example, after AOFC 112 displays the one-click prompt and the user selects the no option, AOFC 112 generates feedback stating that "the solution was not helpful and did not work for program 3.5, on software 14.04 with add-on software 2.1."

In various embodiments, AOFC 112 can identify open questions and/or comments on an online forum or an online blog that are related to the solution the user used. For example, if a user uses a string of code to fix a glitch on software program 2.1, AOFC 112 identifies open questions on the online forum the user found the solution on such as "how do I include bootstrap on software program 2.1?" and "converting string into datetime." In various embodiments, AOFC 112 can automatically generate feedback for the identified questions and display the generated feedback in one-click confirmation prompts asking, "would you like to answer this question?", in which "this question" is one of the identified questions and displaying a yes option, a no option, and an irrelevant option. In a particular embodiment, if the user selects the yes option, then AOFC 112 will answer the identified question and post the generated feedback on the online forum. In various embodiments, the generated feedback can be based on by the pre-approval settings. For example, a user can set the pre-approval setting to not capture or display the user's environment variables. In another example, a user can set the pre-approval setting to only upvote or down vote questions, answers, and comments.

Figure 3:
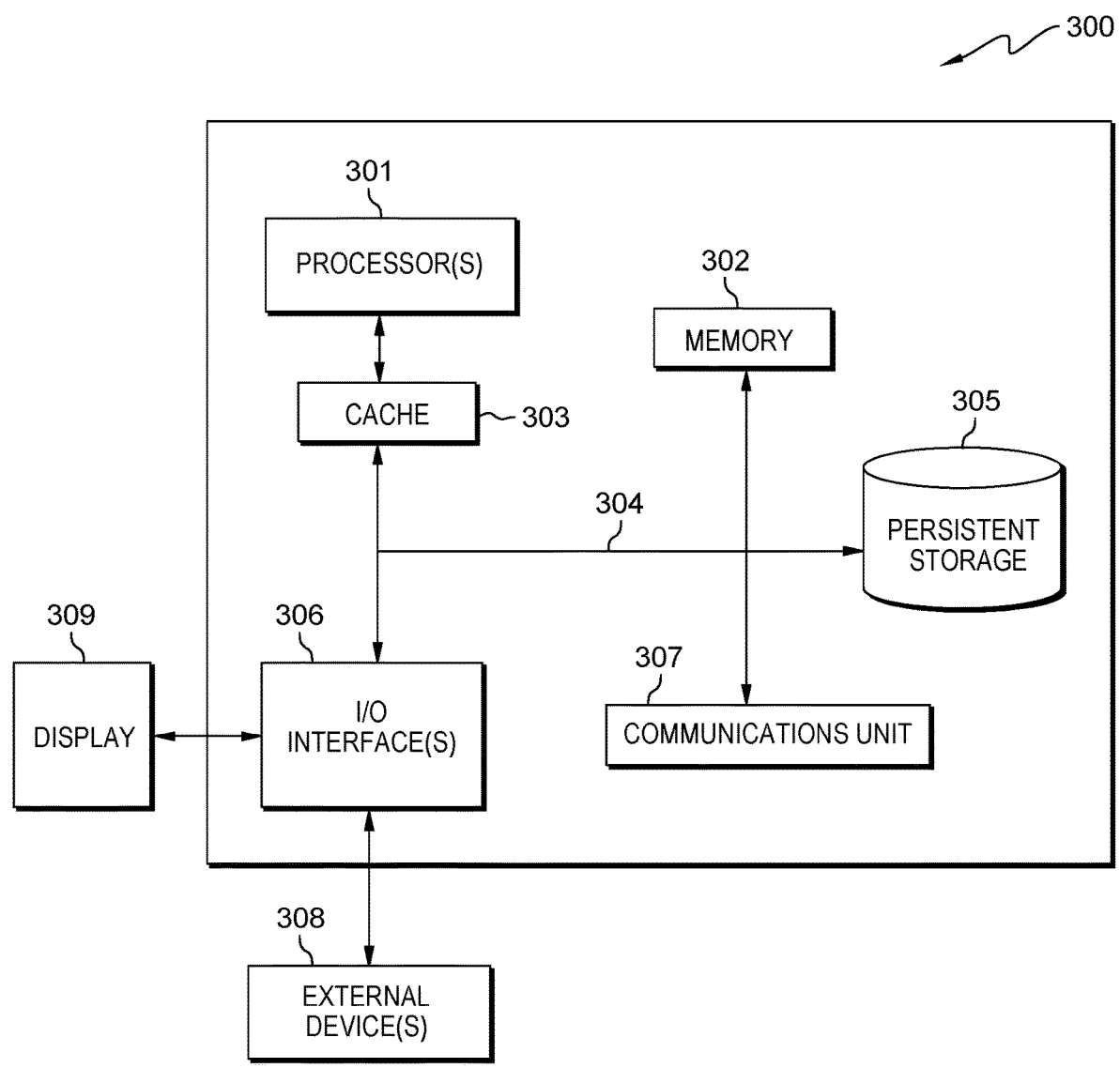
FIG. 3 depicts a block diagram of components of the server computer executing the automated online feedback component within the distributed data processing environment of FIG. 1, in accordance with an embodiment of the present invention.

FIG. 3 depicts a block diagram of components of server computer 120 within distributed data processing environment 100 of FIG. 1, in accordance with an embodiment of the present invention. It should be appreciated that FIG. 3 provides only an illustration of one implementation and does not imply any limitations with regard to the environments in which different embodiments can be implemented. Many modifications to the depicted environment can be made.

FIG. 3 depicts computer system 300, where server computer 120 represents an example of computer system 300 that includes AOFC 112. The computer system includes processors 301, cache 303, memory 302, persistent storage 305, communications unit 307, input/output (I/O) interface(s) 306, display 309, external device(s) 308 and communications fabric 304. Communications fabric 304 provides communications between cache 303, memory 302, persistent storage 305, communications unit 307, and input/output (I/O) interface(s) 306. Communications fabric 304 can be implemented with any architecture designed for passing data and/or control information between processors (such as microprocessors, communications, and network processors, etc.), system memory, peripheral devices, and any other hardware components within a system. For example, communications fabric 304 can be implemented with one or more buses or a crossbar switch.

Memory 302 and persistent storage 305 are computer readable storage media. In this embodiment, memory 302 includes random access memory (RAM). In general, memory 302 can include any suitable volatile or non-volatile computer readable storage media. Cache 303 is a fast memory that enhances the performance of processors 301 by holding recently accessed data, and data near recently accessed data, from memory 302.

Program instructions and data used to practice embodiments of the present invention can be stored in persistent storage 305 and in memory 302 for execution by one or more of the respective processors 301 via cache 303. In an embodiment, persistent storage 305 includes a magnetic hard disk drive. Alternatively, or in addition to a magnetic hard disk drive, persistent storage 305 can include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 305 can also be removable. For example, a removable hard drive can be used for persistent storage 305. Other examples include optical and magnetic disks, thumb drives, and smart cards that are inserted into a drive for transfer onto another computer readable storage medium that is also part of persistent storage 305.

Communications unit 307, in these examples, provides for communications with other data processing systems or devices. In these examples, communications unit 307 includes one or more network interface cards. Communications unit 307 can provide communications through the use of either or both physical and wireless communications links. Program instructions and data used to practice embodiments of the present invention can be downloaded to persistent storage 305 through communications unit 307.

I/O interface(s) 306 enables for input and output of data with other devices that can be connected to each computer system. For example, I/O interface 306 can provide a connection to external devices 308 such as a keyboard, keypad, a touch screen, and/or some other suitable input device. External devices 308 can also include portable computer readable storage media such as, for example, thumb drives, portable optical or magnetic disks, and memory cards. Software and data used to practice embodiments of the present invention can be stored on such portable computer readable storage media and can be loaded onto persistent storage 305 via I/O interface(s) 306. I/O interface(s) 306 also connect to display 309.

Display 309 provides a mechanism to display data to a user and can be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the internet using an Internet Service Provider (ISP)). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for automatically generating feedback for an online forum, the method comprising:

determining, by one or more processors, a user is using a solution to a problem, wherein the solution is posted on an online forum;

responsive to determining the user is using the solution, capturing, by the one or more processors, environment information associated with the user's computing device;

responsive to determining the user is using the solution, populating a one-click response prompt to the user, wherein the response prompt asks the user to provide a response regarding the solution solving the user's problem; and automatically generating, by the one or more processors, feedback associated with the solution to identified open questions, sub-threads and comments on an online forum based on the user's success using the solution to solve a problem, wherein the feedback comprises the environment information and information detailing that the solution solved the problem.

2. The method of claim 1 further comprising:

directing, by the one or more processors, the user to perform an initial setup, wherein the initial setup comprises:

instructing, by the one or more processors, the user to configure pre-approval settings, wherein the pre-approval settings set guidelines for the feedback; and responsive to receiving the configured pre-approval settings linking, by the one or more processors, the pre-approval settings to the online forum.

3. The method of claim 1, further comprising:

determining, by the one or more processors, the user desires to provide feedback to the online forum; and responsive to determining the user desires to provide feedback to the online forum, posting, by the one or more processors, the feedback on the online forum.

4. The method of claim 1, wherein information detailing that the solution solved the problem further comprises:

identifying, by the one or more processors, one or more questions, comments, and threads related to the solution.

5. The method of claim 4 further comprising:
automatically generating, by the one or more processors, feedback for the identified one or more questions, comments, and threads related to the solution.

6. The method of claim 1, wherein determining the user is using the solution further comprises an explicit copy and paste detector or an implicit copy and paste detector to detect when the user is trying the solution from the online forum, wherein the explicit copy and paste detector uses key logging to detect that the user has used a copy function on an operating system (OS) to copy content from the online forum and that the user has used a paste function on the OS to paste the content from a browser onto a file, and the implicit copy and paste detector captures the users interactions between one or more files and the online forum by tracking a repeated switching between a set of two or more applications and a k threshold similarity of phrases between the solution from the online forum and the one or more file being corrected.

7. The method of claim 1 wherein determining the solution solved the problem further comprises a rule-based system automatically determining the solution solved the problem.

8. A computer program product for automatically generating feedback for an online forum, the computer program product comprising;
one or more computer readable storage devices and program instructions stored on the one or more computer readable storage devices, the stored program instructions comprising:
program instructions to determine a user is using a solution to a problem, wherein the solution is posted on an online forum;
responsive to determining the user is using the solution, program instructions to capture environment information associated with the user's computing device;
responsive to determining the user is using the solution, program instructions to populate a one-click response prompt to the user, wherein the response prompt asks the user to provide a response regarding the solution solving the user's problem; and
program instructions to automatically generate feedback associated with the solution to identified open questions, sub-threads and comments on an online forum based on the user's success using the solution to solve a problem, wherein the feedback comprises the environment information and information detailing that the solution solved the problem.

9. The computer program product of claim 8 further comprising:
program instructions to direct the user to perform an initial setup, wherein the initial setup comprises:
program instructions to instruct the user to configure pre-approval settings, wherein the pre-approval settings set guidelines for the feedback; and
responsive to receiving the configured pre-approval settings program instructions to link the pre-approval settings to the online forum.

10. The computer program product of claim 8, further comprising:
program instructions to determine the user desires to provide feedback to the online forum; and responsive to determining the user desires to provide feedback to the online forum, program instructions to post the feedback on the online forum.

11. The computer program product of claim 8, wherein information detailing that the solution solved the problem further comprises:
program instructions to identify one or more questions, comments, and threads related to the solution.

12. The computer program product of claim 11 further comprising:
program instructions to automatically generate feedback for the identified one or more questions, comments, and threads related to the solution.

13. The computer program product of claim 8, wherein determining the user is using the solution further comprises an explicit copy and paste detector or an implicit copy and paste detector to detect when the user is trying the solution from the online forum, wherein the explicit copy and paste detector uses key logging to detect that the user has used the copy function on the operating system (OS) to copy content from the online forum and that the user has used the paste function on the OS to paste the content from the browser onto a file, and the implicit copy and paste detector captures the users interactions between one or more files and the online forum by tracking the repeated switching between a set of two or more applications and a k threshold similarity of phrases between the solution from the online forum and the one or more file being corrected.

14. The computer program product of claim 8 wherein determining the solution solved the problem further comprises a rule-based system automatically determining the solution solved the problem.

15. A computer system for automatically generating feedback for an online forum, the computer system comprising:
one or more computer processors;
one or more computer readable storage devices;
program instructions stored on the one or more computer readable storage devices for execution by at least one of the one or more computer processors, the stored program instructions comprising:
program instructions to determine a user is using a solution to a problem, wherein the solution is posted on an online forum;
responsive to determining the user is using the solution, program instructions to capture environment information associated with the user's computing device;
responsive to determining the user is using the solution, program instructions to populate a one-click response prompt to the user, wherein the response prompt asks the user to provide a response regarding the solution solving the user's problem; and
program instructions to automatically generate feedback associated with the solution to identified open questions, sub-threads and comments on an online forum based on the user's success using the solution to solve a problem, wherein the feedback comprises the environment information and information detailing that the solution solved the problem.

16. The computer system of claim 15 further comprising:
program instructions to direct the user to perform an initial setup, wherein the initial setup comprises:
program instructions to instruct the user to configure pre-approval settings, wherein the pre-approval settings set guidelines for the feedback; and
responsive to receiving the configured pre-approval settings program instructions to link the pre-approval settings to the online forum.

17. The computer system of claim 15, further comprising:
program instructions to determine the user desires to provide feedback to the online forum; and
responsive to determining the user desires to provide feedback to the online forum, program instructions to post the feedback on the online forum.

18. The computer system of claim 15, wherein information detailing that the solution solved the problem further comprises:
program instructions to identify one or more questions, comments, and threads related to the solution; and
program instructions to automatically generate feedback for the identified one or more questions, comments, and threads related to the solution.

19. The computer system of claim 15, wherein determining the user is using the solution further comprises an explicit copy and paste detector or an implicit copy and paste detector to detect when the user is trying the solution from the online forum, wherein the explicit copy and paste detector uses key logging to detect that the user has used the copy function on the operating system (OS) to copy content from the online forum and that the user has used the paste function on the OS to paste the content from the browser onto a file, and the implicit copy and paste detector captures the users interactions between one or more files and the online forum by tracking the repeated switching between a set of two or more applications and a k threshold similarity of phrases between the solution from the online forum and the one or more file being corrected.

20. The computer system of claim 15 wherein determining the solution solved the problem further comprises a rule-based system automatically determining the solution solved the problem.

* * * * *